Sept. 6, 1949.  P. A. JAEGER  2,480,931
STERILIZING SINK

Filed Aug. 27, 1946  2 Sheets-Sheet 1

INVENTOR
PAUL A. JAEGER
BY
McMorrow, Berman & Davidson
ATTORNEYS

Sept. 6, 1949. P. A. JAEGER 2,480,931
STERILIZING SINK
Filed Aug. 27, 1946 2 Sheets-Sheet 2
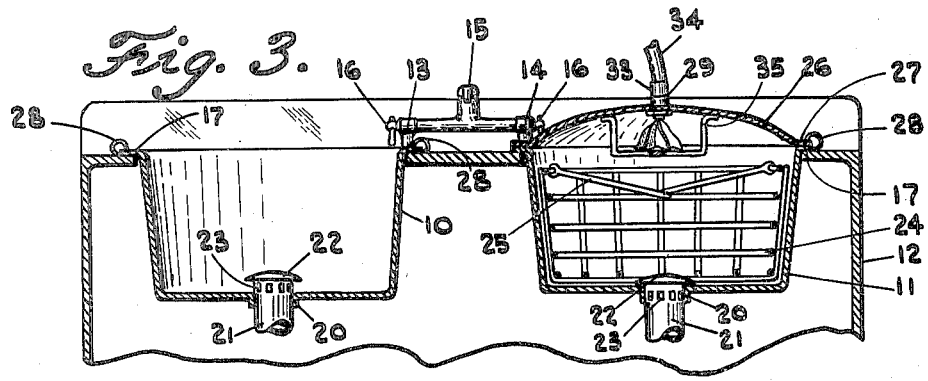
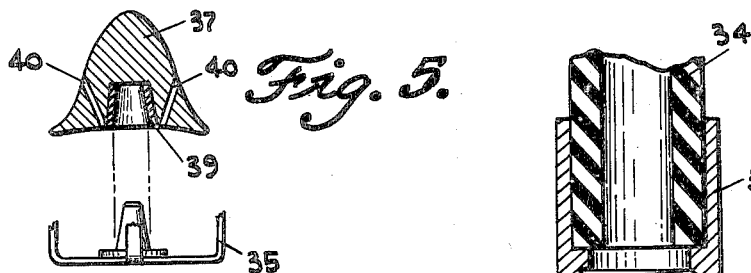
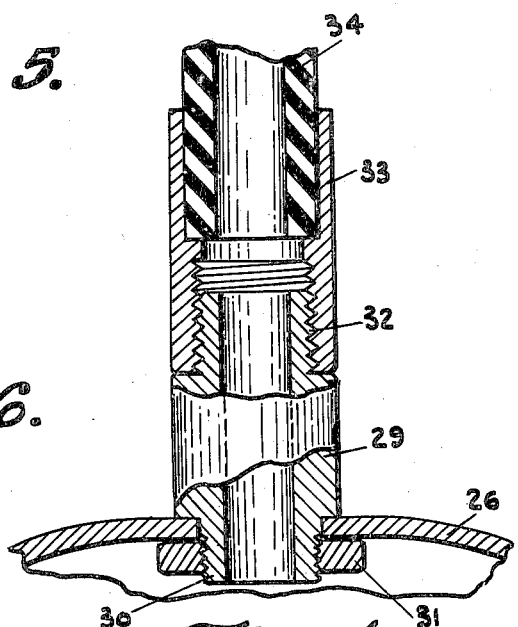
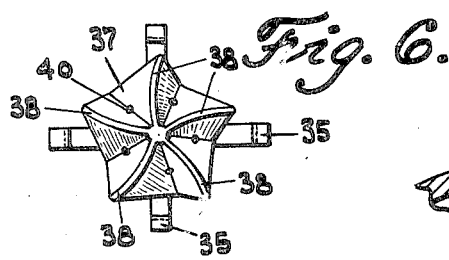
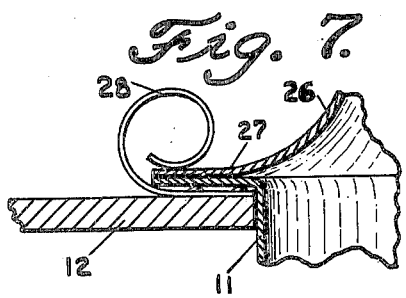
INVENTOR
PAUL A. JAEGER
By
McMorrow, Berman & Davidson
ATTORNEYS Patented Sept. 6, 1949

2,480,931

UNITED STATES PATENT OFFICE 2,480,931

STERILIZING SINK

Paul A. Jaeger, Canton, Ill.

Application August 27, 1946, Serial No. 693,358

4 Claims. (Cl. 21—99)

1

My invention relates to kitchen sinks and more particularly to sterilizing sinks.

The object of my invention is to provide a sterilizing kitchen sink having two compartments connected with the drain pipe and each having an individually operable drain valve.

Another object of my invention is to provide a kitchen sink having two compartments adapted to be used selectively for washing and for sterilizing dishes, glasses, silverware and the like and having exchangeable lids or covers.

Other objects of my invention may appear in the following specification describing my invention with reference to the accompanying drawings illustrating a preferred embodiment of my invention.

It is, however, to be understood, that my invention is not to be limited and restricted to the exact construction and combination of parts described in the specification and shown in the drawing, but that such changes and modifications can be made, which fall within the scope of the claims appended hereto.

In the drawings:

Figure 3 is a fragmentary longitudinal sectional view taken on the vertical center plane of the sink shown in Figure 1.

Figure 4 is a fragmentary sectional view through the cover or lid of the sink showing the connection of the rubber hose leading to the water spigot in the kitchen with the sink cover.

Figure 5 is an exploded view, partly shown in section and partly in elevation, of the rotor of the sterilizing sink and the bracket therefor.

Figure 6 is a top plan view of the assembled parts shown in Figure 5, and

Figure 7 is a fractional sectional view showing a spring retainer securing the cover or lid removably on a sink compartment.

Figure 1:
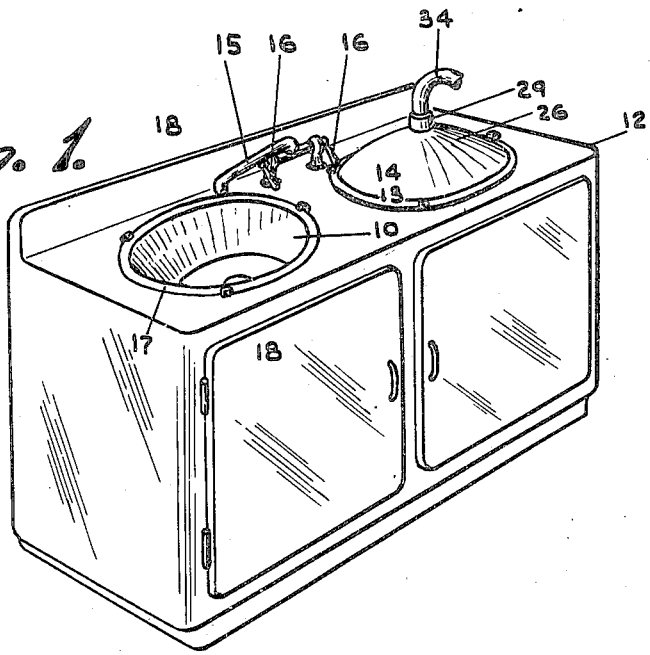
Figure 1 is a perspective view of a sterilizing kitchen sink according to my invention built into or surrounded by a cabinet.
Figure 2:
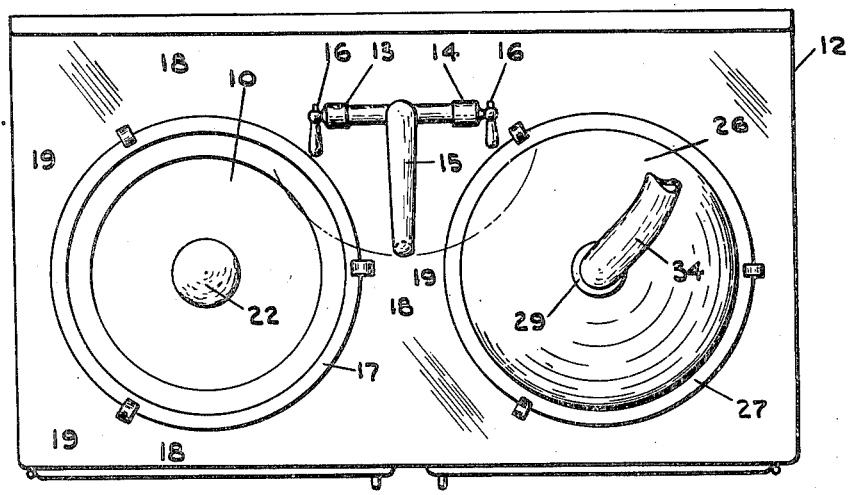
Figure 2 is a top plan view of Figure 1.

Referring now in detail to the drawings two sinks 10 and 11 respectively are arranged in a cabinet 12. A cold water pipe 13 and a hot water pipe 14 lead to a mixing spigot 15, and in each pipe a control and shut-off valve 16 is arranged in a well known manner.

Each sink 10 and 11 is formed like a tub and has at its upper edge an outwardly extending circumferential flange 17 adapted to rest on the top of the cabinet 12. On each flange 17 a plurality of spring clips 18 are arranged at equal distances from each other, which are secured to

2 the cabinet top by means of screws 19. Centrally of the bottom of each sink 10 and 11 a hole is provided surrounded by a downwardly extending flange 20.

A tubular sliding member 21 is arranged slidably in each of the holes in the sink bottoms and is guided by the corresponding downwardly extending flange 20. Each tubular sliding member 21 is closed on its top by a disk-like cap 22 extending beyond the member, and is provided with a plurality of holes or perforations 23 in its circumferential wall adjacent and below the disk-like cap 22. The sliding drain members 21 are individually operated in a well known manner by means of a lever (not shown) arranged inside of the cabinet 12. When the sliding drain member 21 is lifted, as shown at the left in Figure 3 any liquid in the sink 10 will drain off through the holes 23 in the circumferential wall of the sliding drain member 21. When the drain member is lowered, so that the disk-like cap 22 contacts the bottom of the sink, as shown at the right in Figure 3, the sink drain is closed and the liquid stays in the sink.

A wire rack 24, adapted to receive the dishes, etc., to be washed and sterilized, fits into either one of the sinks 10 or 11 and has handles 25 thereon to facilitate the handling of the rack.

A cover or lid 26 has a horizontally extending circumferential flange 27 fitting onto the flange 17 on the sink and adapted to rest thereon.

The spring clips 18 have a spirally upwardly curved pressure end 28 adapted to engage the cover flange 27 and secure the cover 26 removably on either sink.

Centrally of the cover 26 a hole is provided. A pipe fixture 29 has a downwardly extending outwardly threaded nipple 30 thereon, which extends through the hole in the cover 26 and is held in position by a nut 31 engaging the under surface of the cover 26.

The pipe fixture 29 has a second outwardly threaded nipple 32 on its upper end, which is threadedly engaged by tubular fixture 33 and in the upper end of the tubular fixture a flexible tubing 34 is securely inserted, the free end of which is adapted to be connected with the mixing spigot 15.

On the under side of the cover 26 a cross-shaped bracket 35 is securely attached, for instance by welding, so that the center of the bottom of the cross-shaped bracket is located in line with the axis of the pipe fixture 29.

Onto the bottom of the bracket 35 a coneshaped core 36 is fastened and extends upwardly therefrom.

A rotor 37 has a substantially pentagonal base and its body forms a pentagonal pyramid, on the surface edges of which curved fins 38 are formed.

In the center of the base of the rotor a conical hollow is formed, into which a hardened, finished conical sleeve 39 is pressed, the bore whereof fits onto the conical core 36 on the bracket 35.

When the flexible tubing 34 is attached to the spigot 15 and the water is turned on, it will hit the rotor fins 38, so that the rotor will be forced to rotate on the core, whereby the water will be sprayed onto the contents of the wire rack. In order to spray water also onto the central part of the rack, a plurality of holes 40 are provided in the rotor and arranged at an angle converging toward the axis of the rotor as shown in Figure 5.

When the sink is in use, both drain valves 21 are closed. Sink 11 is filled approximately half full with hot water for tempering the glass ware and the like, which are washed in the other sink 10. When all the dishes, etc., are located in the wire rack 24, the cover 26 is secured on the sink 11 and the flexible tubing 34 is attached to the spigot 15. The drain is opened to drain the tempering rinse water slowly from the sink, and the hot water is turned on to start the rotor, and the flow of the sterilizing rinse water is increased until full force is obtained.

When the sterilizing and rinsing is finished, the water is drained off and the cover removed as soon as it is cool enough to be handled.

Having described my invention I claim as new and desire to secure by Letters Patent:

1. A device for alternate washing and sterilizing of dishes and the like, said device comprising a support having two basins thereon arranged in substantially the same horizontal plane, a hot and cold water mixing valve on said support between said basins, said mixing valve having a discharge pipe movable to supply water to either of said basins, a cover adapted to interchangeably cover either of said basins, retaining means on said support at the edges of said basins for retaining the cover when in place thereon, said cover comprising a flexible pipe secured to discharge through a central part of the top of said cover, means for removably connecting said flexible pipe to said mixing valve discharge pipe and enabling supplying hot water from said mixing valve to a basin covered by said cover, and drain valves at the bottom of said basins, the drain valve of the covered basin being adapted to be open while hot water is supplied to the covered basin for sterilizing dishes or the like present in the covered basin and the drain valve of the uncovered basin being adapted to be closed to retain wash water in which dishes or the like reside in preparation for sterilization in a covered basin.

2. A dish washing device comprising a support having a basin thereon and a mixing valve for supplying hot and cold water, a cover for said basin having a peripheral flange arranged to rest upon said support around said basin, clips on said support removably engageable with said peripheral flange for retaining said cover in covering relation to said basin, a tubular adapter secured to and traversing a central part of the top of said cover, a flexible hose connected to said adapter above said cover, and means connecting said hose to said mixing valve whereby water can be supplied to said basin to fall from a central part of the top of the cover upon dishes or the like present in said basin for washing the same.

3. A dish washing device comprising a support having a basin thereon and a mixing valve for supplying hot and cold water, a cover for said basin having a peripheral flange arranged to rest upon said support around said basin, clips on said support removably engageable with said peripheral flange for retaining said cover in covering relation to said basin, a tubular adapter secured to and traversing a central part of the top of said cover, a flexible hose connected to said adapter above said cover, and means connecting said hose to said mixing valve whereby water can be supplied to said basin to fall from a central part of the top of the cover upon dishes or the like present in said basin for washing the same, a fluted, vertical axis rotor supported in the upper part of said cover beneath the lower end of said tubular adapter so as to be rotated by water issuing from said adapter and in rotating throw water centrifugally toward the sides of said basin.

4. A dish washing device comprising a support having a basin thereon and a mixing valve for supplying hot and cold water, a cover for said basin having a peripheral flange arranged to rest upon said support around said basin, clips on said support removably engageable with said peripheral flange for retaining said cover in covering relation to said basin, a tubular adapter secured to and traversing a central part of the top of said cover, a flexible hose connected to said adapter above said cover, and means connecting said hose to said mixing valve whereby water can be supplied to said basin to fall from a central part of the top of the cover upon dishes or the like present in said basin for washing the same, a fluted, vertical axis rotor supported in the upper part of said cover beneath the lower end of said tubular adapter so as to be rotated by water issuing from said adapter and in rotating throw water centrifugally toward the sides of said basin, said rotor being formed with downwardly converging passages acting to concentrate part of the water impinging upon said rotor at the center of said basin.

PAUL A. JAEGER.

REFERENCES CITED

The following references are of record in the file of this patent:

UNITED STATES PATENTS

| Number | Name | Date |
| --- | --- | --- |
| Re. 22,936 | Wilson | Nov. 18, 1947 |
| 2,168,770 | Gunn | Aug. 8, 1939 |